United States Patent [19]

Kooiman

[11] 4,206,954

[45] Jun. 10, 1980

[54] GUIDE BUSH

[75] Inventor: Pieter L. Kooiman, Ambach, Netherlands

[73] Assignee: Avedko b.v., Drodrecht, Netherlands

[21] Appl. No.: 925,556

[22] Filed: Jul. 17, 1978

[30] Foreign Application Priority Data

Jul. 20, 1977 [NL] Netherlands .................. 7708061

[51] Int. Cl.$^2$ .............................................. A47F 1/06
[52] U.S. Cl. ................................. 312/71; 211/49 D; 221/279
[58] Field of Search ............... 312/71, 72, 42, 61; 211/49 D; 221/279, 280

[56] References Cited

U.S. PATENT DOCUMENTS

| | | | |
|---|---|---|---|
| 3,407,015 | 10/1968 | Silberberg | 312/71 |
| 3,717,397 | 2/1973 | Cummings | 312/71 |
| 3,738,722 | 6/1973 | Kooiman | 211/49 D |
| 3,937,361 | 2/1976 | House | 312/71 |

Primary Examiner—Mervin Stein
Assistant Examiner—Alexander Grosz
Attorney, Agent, or Firm—Andrus, Sceales, Starke & Sawall

[57] ABSTRACT

A device for dispensing articles, such as trays, plates, etc., maintains the uppermost article in the stack at a predetermined dispensing level independent of the number of articles in the stack. The device has an upper annular member through which the articles are dispensed and a plurality of vertical posts connecting the annular member to a bottom member. An article carrier has guide bushings for vertically slidable movement on the vertical post members. The guide bushings are movably mounted in the article carrier to permit horizontal movement of the posts to accommodate articles of different sizes.

15 Claims, 4 Drawing Figures

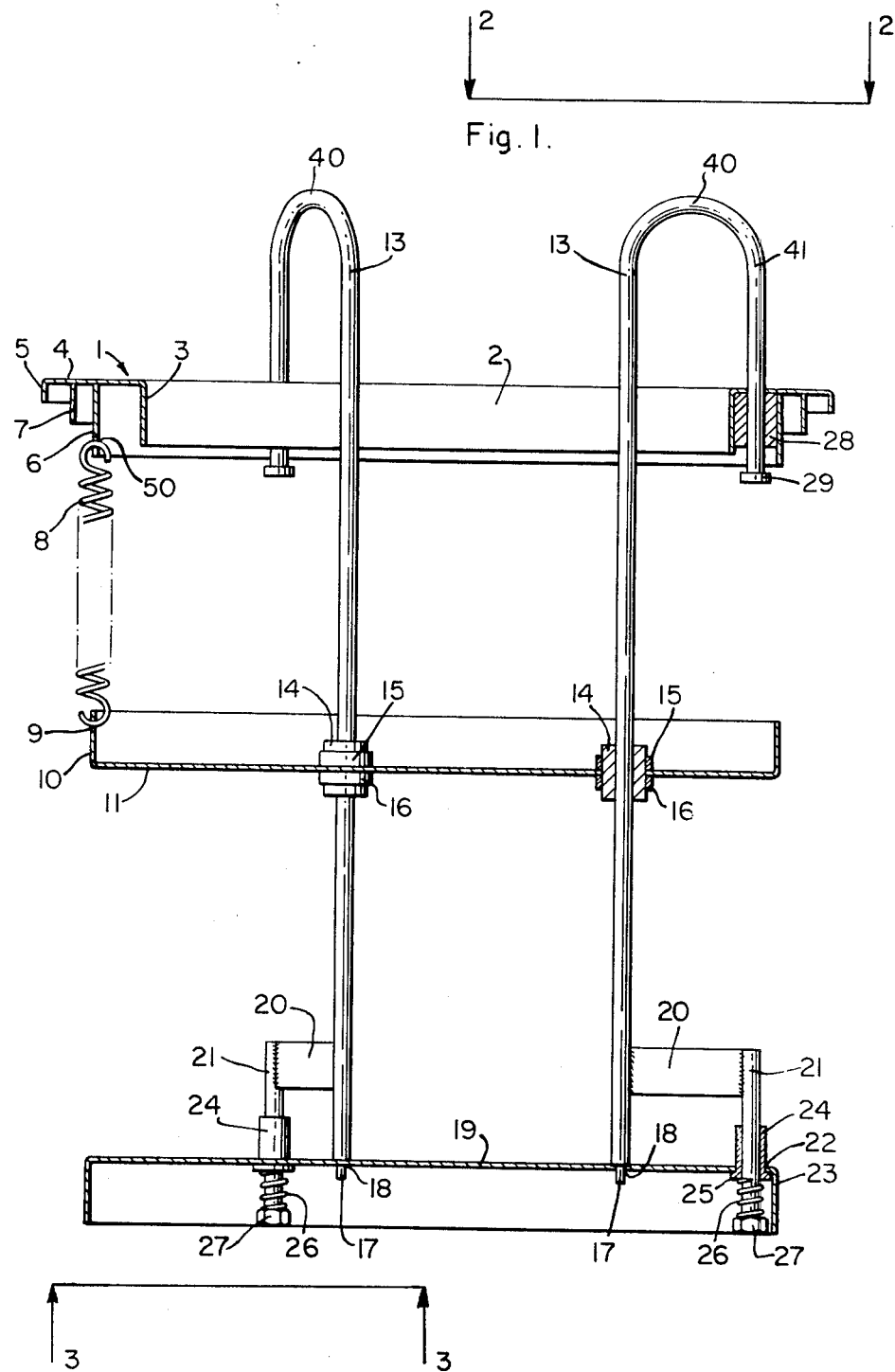

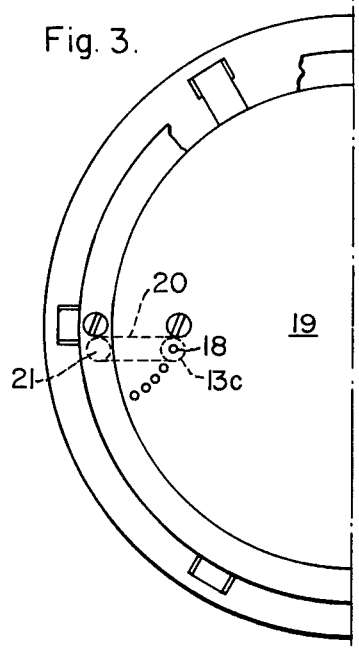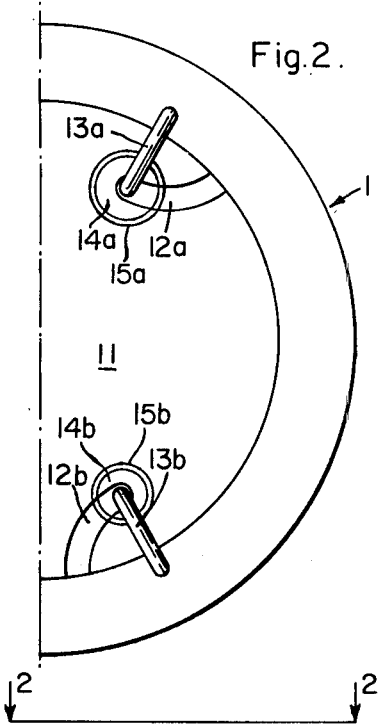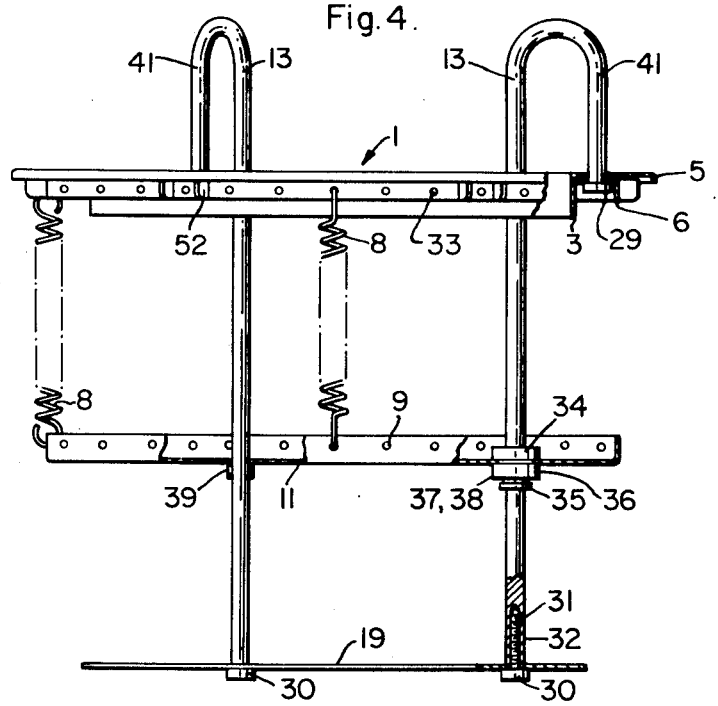

GUIDE BUSH

BACKGROUND OF THE INVENTION

The invention relates to a device for dispensing articles from a stack, always keeping the uppermost article of the stack at a predetermined level, independent of the number of articles of the stack, which device comprises a vertical container for the stack of articles, with a flange having a passage opening and a bottom, a carrier for the articles cooperating with supporting means, said carrier being able to move unrotatably up and down under influence of guiding means, while between the flange and the bottom a number of mutually and with the longitudinal axis of the container parallely adjusted posts are provided.

A device of this kind is known from the U.S. Pat. No. 3,738,722 of applicant. With such a device a number of stationary posts are present on the outside of the carrier, said posts having a U-shaped cross section, wherein inside the U-shaped profile wheels of guide carriages run, which are connected with an annular part of the carrier, said carrier also being suspended to the flange by means of springs. Further three adjustable posts are present, which may rotate around points pivotally connected to the flange and the bottom, such that the space between the adjustable posts may be adjusted to articles of different diameter.

SUMMARY OF THE PRESENT INVENTION

The purpose of the invention is to simplify the construction of a device of this kind, thus decreasing the number of parts and obtaining a cheaper but moreover very reliable structure while use of the structure is facilitated and the aesthetical exterior is improved.

This purpose is according to the invention achieved by providing the carrier with guide bushes that are slidable over the posts.

By application of the invention it is reached that the guide bushes at the same time provide for the connection of the carrier with the posts as well as for the non-turning movement of the container parallel to the longitudinal axis of the container.

According to a first embodiment of the invention, wherein the posts are adjustable between a largest and a smallest distance to the longitudinal axis of the container, which posts guide the stack of articles during its up- and downward movement through the container, the guide bushes are slidable with respect to the carrier between the largest and the smallest distance to the longitudinal axis of the container.

According to a second preferred embodiment of the invention the flange is suspended on the posts. Through this it is achieved that the posts also serve for forming the carrier, while the whole device is delivered easily as a guilding set to be assembled on the spot, so that further simplification and decrease of the production, packing and delivery costs is achieved.

DESCRIPTION OF THE DRAWINGS

The invention will be further elucidated with reference to the accompanying drawings in which FIG. 1 shows a schematic side-view in axial cross-section of an embodiment of the invention.

FIG. 2 is top view of the righthand part of the device according to FIGS. 1 and 4, FIG. 3 is a bottom view of FIG. 1 showing the left-hand part, and FIG. 4 shows, in an analogous way to FIG. 1, a second embodiment of a device according to the invention.

DETAILED DESCRIPTION OF THE PREFERRED EMBODIMENT

According to FIGS. 1 and 2 the first embodiment of the device 1 comprises a flange, which is generally indicated with 4, said flange being provided with a round opening 2, which is limited by a round inner tube 3. The flange 4 has a flat upper side and is limited on the outside by an outer tube 5. Between the inner tube 3 and the outer tube 5 two tubes 6 and 7, running downwards, are provided. The tube 6 carries a number of holes 50, which are spaced along and from its bottom edge; through which the ends of a number of coil spring 8 may be hooked, the other end of said springs being hooked in holes 9 in an edge tube 10 of the platelike carrier 11. This is provided with three arcuate grooves 12 through which, respectively, the posts 13 run, said posts being round in cross section. Two arcuate grooves 12a and 12b and two posts 13a and 13b are shown in FIG. 2. Over these posts 13 guiding bushes 14 may slide, FIG. 2 showing bushes 14a and 14b. These guiding bushes may also slide through the arcuate grooves 12 in the platelike carrier 11, the inner surface of said guiding bushes preferably being formed by polytetrafluoraetheylene plastics. However, with respect to this carrier 11, guiding bushes 14 are fixed by means of clips 14 to the upper side of the carrier 11 and respectively the clips 16 to the bottom side of the carrier.

The bottom side of the posts 13 is provided with a narrower pin part 17 on the end that may respectively thrust in one of the hole 18 in the bottom 19. The series of holes are vertically aligned below the grooves, so that the posts 13 may move through the grooves and may be fixed in a uniform manner in the holes 18.

Each of the posts 13 is provided with an extending cross arm 20 near the bottom side, said cross arms at their outer end each having a pin 21, running parallel to the respective post. This pin 21 extends through a hole 22, said hole being provided near the vertical outer tube 23 of the bottom while a sleeve 24 receives the pin 21. The sleeve 24 has a protruding collar 25 on its bottom side, said collar supporting the one end of the coil spring 26, the other end of the coil spring being supported by the upper plane of a nut 27, the latter being screwed on the bottom end of the pin 21 by a screw thread. In this way each of the posts 13 may be pulled out of one of the fixing hole 18 and fixed in another hole.

Each of the posts 13 is connected on its upper end to a parallel part 41 through a preferably arcuate part 40, said parallel part 41 extending through a hole in the upper surface of flange 4. Moreover below the flange 4 a sleeve 28 is adjusted on each part 41, while a short distance beneath this sleeve 28 a nut 29 has been screwed. Each post 13 consists of a round bar.

The dispensing device according to the invention is adapted to be both built in, the tube 7 being thrust in a corresponding hole in the top of a table, carriage or counter, the bottom 19 resting on a supporting surface, lying underneath, and for free arrangement, the whole device being self-supporting.

FIG. 4 shows a second embodiment of the device according to the invention. A number of parts of the embodiment according to FIG. 1 are found again herein. In FIG. 4 the posts 13 are fixedly connected on the upper part to the flange 4 through parts 41 and screw bolts 29 and on the bottom part to the bottom 19 through screw bolts 30. The bolts press on the bottom side against bottom 19, while the shaft 31 is screwed in a screw bore 32 in the post 13. Further below the flange 4, instead of the tube 7, a number of brackets 52 are connected to the tube 6 along the circumference, said brackets taking care of centering the device in a hole in a counter, table etc.

The embodiment shown on the right side of FIG. 4 has a collar 34 above the carrier 11. A cylinder 35 extends through the carrier, on which a ring 36 is mounted, said ring being fixed with a clip 37, tensioned in a groove 38 in the cylinder.

The embodiment of the guide bushing 39 shown on the left side of FIG. 4 is formed by pressing it out the plate material of the carrier 11. This bushing 39 may be found on the upper part as well as on the bottom part of the carrier, but is formed therewith integrally so that it cannot be moved, such as in the former embodiments of the bushings.

The device according to the invention may be delivered with loose components, as a building set, said set being assembled by the customer on the spot, thus saving production, packing and transportation costs.

The invention is not restricted to the embodiments shown and described, but extends to all variations thereof. So the passage opening 2 may be square, or polygonal instead of round, according to the outer surface of the articles to be delivered, said articles consisting for example of plates, serving trays etc. Further the guiding may take place in an other way that with guide bushes for example according to the U.S. Pat. No. 3,738,722 of applicant, whereby inside the U-shaped profile, wheels of guiding carriages run, which are connected to the carrier.

I claim:

1. A device for dispensing articles from a stack while maintaining the uppermost article of the stack at a predetermined dispensing level independent of the number of articles in the stack, said device comprising: an upper annular member through which the articles are dispensed; a bottom member vertically spaced beneath said annular member along a central axis of the dispensing device; a plurality of circumferentially spaced, parallel posts extending between said annular member and said bottom, said posts being movable toward and away from said central axis in accordance with the size of the dispensed articles; an article carrier supported in said device for vertical travel, said article carrier having guide bushes embracing said posts and slidable therealong for permitting vertical travel of said carrier and for guiding same during such travel, said guide bushes being slidably movable with respect to said carrier toward and away from said central axis to accommodate movement of said posts with respect to said central axis.

2. Device according to claim 1, characterized in that the guide bushes (14) have a passage opening that is adapted to the cross section of the posts (13).

3. Device according to claim 2, characterized in that the guide bushes (14) have a round passage opening.

4. Device according to claim 2 or 3, characterized in that the guide bushes are provided with a layer of plastic material at the inner surface, formed of polytetrafluorethylene or the like.

5. The device according to claim 1 characterized in that the carrier (11) is provided with a slit for each guide bush (14) for permitting said toward and away movement of said posts.

6. The device according to claim 5 wherein said posts are arcuately movable toward and away from central axis and wherein said slits are arcuate.

7. The device according to claim 6 wherein said posts are connected to said bottom member by means of offset pivot pins running parallel to and being connected to said posts.

8. The device according to claim 7 wherein said pivot pins are journalled in said bottom member and contain bias means permitting limited upward vertical movement of said posts, said posts having locating means on the lower ends thereof coacting with locating means on said bottom member for positioning said posts at desired locations with respect to said central axis.

9. The device according to claim 8 wherein said locating means on said posts comprise extensions of reduced cross-section and said locating means on said bottom member comprises a plurality of holes suitable for receiving said extensions and vertically aligned with the corresponding slits in said carrier.

10. The device according to claim 6 wherein the upper end of said posts are pivotally mounted on said annular member.

11. Device according to claim 1, characterized in that the guide bush (14) has a slidable means of confinement (15, 16) on both sides of the carrier (11).

12. The device according to claim 11 characterized in that said guide bush is formed with a collar above the carrier and a cylinder extending through said carrier containing a second collar retained thereon beneath said carrier.

13. Device according to claim 1 or 4, characterized in that the guide bushes are being formed out of one piece with the plate material of the carrier.

14. The device according to claim 1 wherein said article carrier is supported from said annular member.

15. The device according to claim 1 wherein said post members are adjustably bolted to said bottom member for providing movement of said posts toward and away from said central axis.

* * * * *